US011967110B2

(12) United States Patent
Alexovski et al.

(10) Patent No.: US 11,967,110 B2
(45) Date of Patent: Apr. 23, 2024

(54) ASSEMBLY AND MEASUREMENT OF AN ASSEMBLY FOR CALIBRATING A CAMERA

(71) Applicant: Conti Temic microelectronic GmbH, Nuremberg (DE)

(72) Inventors: Marko Alexovski, Bermatingen (DE); Ivan Franz, Ingolstadt (DE); Aless Lasaruk, Lindau (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 436 days.

(21) Appl. No.: 17/299,091

(22) PCT Filed: Dec. 16, 2019

(86) PCT No.: PCT/DE2019/200147
§ 371 (c)(1),
(2) Date: Jun. 2, 2021

(87) PCT Pub. No.: WO2020/125876
PCT Pub. Date: Jun. 25, 2020

(65) Prior Publication Data
US 2022/0067971 A1    Mar. 3, 2022

(30) Foreign Application Priority Data
Dec. 21, 2018   (DE) ............... 10 2018 222 796.9

(51) Int. Cl.
*G06K 9/00*    (2022.01)
*G06T 7/70*    (2017.01)
(Continued)

(52) U.S. Cl.
CPC ............. *G06T 7/80* (2017.01); *G06T 7/70* (2017.01); *H04N 17/002* (2013.01)

(58) Field of Classification Search
CPC ........... G06T 7/80; G06T 7/70; H04N 17/002; G03B 17/566; G03B 43/00
See application file for complete search history.

(56) References Cited

U.S. PATENT DOCUMENTS 6,064,757 A * 5/2000 Beaty ................ G06T 7/0002
                                            250/559.31
9,215,453 B2 * 12/2015 Macchia ............ G01B 11/275
(Continued)

FOREIGN PATENT DOCUMENTS

CN      105407342 A    3/2016
CN      104240221 B    2/2017
(Continued)

OTHER PUBLICATIONS

PCT English translation of the International Search Report of the International Searching Authority for International Application PCT/DE2019/200147, dated Apr. 20, 2020, 2 pages, European Patent Office, HV Rijswijk, Netherlands.
(Continued)

*Primary Examiner* — Shervin K Nakhjavan
(74) *Attorney, Agent, or Firm* — BUCHANAN INGERSOLL & ROONEY PC

(57) ABSTRACT

The invention relates to an assembly for calibrating a camera (31) to be calibrated, said assembly comprising:
a first positioning base (43) for accommodating a reference camera adapter (40) or for accommodating an adapter (34) for the camera (31) to be calibrated;
an auxiliary target (21);
the reference camera adapter (40) for accommodating a reference camera housing (11) or the auxiliary target (21);
the adapter (34) for accommodating the camera (31) to be calibrated;
(Continued)

a second positioning base (41) for accommodating the reference camera housing (11);

at least one calibration target (51, 52, 53) arranged such that it can be captured by the reference camera (11) accommodated by the first positioning base (43) or can be captured by the camera (31) to be calibrated;

and the reference camera housing (11) for accommodating the reference camera (12, 13);

wherein the first positioning base (43) is arranged (position 54) such that a first image captured by the reference camera (12, 13) accommodated in the first positioning base (43) contains the at least one calibration target (51, 52, 53), and wherein the second positioning base (41) is arranged (position 55 or position 56) such that a second image captured by the reference camera (12, 13) accommodated in the second positioning base (41) contains the at least one calibration target (51, 52, 53) and the auxiliary target (21) accommodated in the first positioning base (43).

10 Claims, 9 Drawing Sheets

(51) Int. Cl.
*G06T 7/80* (2017.01)
*H04N 17/00* (2006.01)

(56) References Cited

U.S. PATENT DOCUMENTS

| | | | | |
|---|---|---|---|---|
| 9,489,735 | B1* | 11/2016 | Reitmayr | H04N 9/3164 |
| 9,621,823 | B2* | 4/2017 | Ramegowda | H04N 5/33 |
| 9,965,870 | B2* | 5/2018 | Claveau | H04N 17/002 |
| 9,986,232 | B1* | 5/2018 | Shylanski | G06V 30/224 |
| 10,009,595 | B2 | 6/2018 | Lin et al. | |
| 10,269,141 | B1* | 4/2019 | Shotan | H04N 25/61 |
| 10,488,501 | B2 | 11/2019 | Becker | |
| 10,841,562 | B2* | 11/2020 | Heidemann | G01B 3/30 |
| 10,861,193 | B2* | 12/2020 | Mead | G06T 5/006 |
| 10,977,829 | B2* | 4/2021 | Ma | G06T 7/55 |
| 10,989,839 | B1* | 4/2021 | Matthews | G01W 1/10 |
| 2006/0008116 | A1* | 1/2006 | Kiraly | G06T 7/20 |
| | | | | 384/103 |
| 2008/0095468 | A1* | 4/2008 | Klemmer | H04N 9/3194 |
| | | | | 382/285 |
| 2010/0165116 | A1* | 7/2010 | Hsieh | H04N 5/2224 |
| | | | | 348/187 |
| 2010/0238291 | A1 | 9/2010 | Pavlov et al. | |
| 2012/0007985 | A1* | 1/2012 | Inui | H04N 17/002 |
| | | | | 348/148 |
| 2012/0287287 | A1* | 11/2012 | Grossmann | H04N 17/002 |
| | | | | 348/181 |
| 2014/0201844 | A1* | 7/2014 | Buck | G06F 21/554 |
| | | | | 726/26 |
| 2014/0247326 | A1* | 9/2014 | Hebert | G06T 7/521 |
| | | | | 348/46 |
| 2015/0178928 | A1* | 6/2015 | Mika | G06T 7/74 |
| | | | | 348/142 |
| 2016/0073101 | A1* | 3/2016 | Keaffaber | H04N 17/002 |
| | | | | 348/187 |
| 2016/0373734 | A1* | 12/2016 | Cole | H04N 13/232 |
| 2017/0221210 | A1* | 8/2017 | Martinello | G06T 7/80 |
| 2017/0280135 | A1* | 9/2017 | Shroff | G06T 7/80 |
| 2017/0287166 | A1 | 10/2017 | Claveau et al. | |
| 2017/0374360 | A1 | 12/2017 | Kranski et al. | |
| 2019/0182469 | A1* | 6/2019 | Sakakima | H04N 5/265 |
| 2020/0124406 | A1* | 4/2020 | Gorschenew | H04N 17/002 |
| 2021/0134012 | A1* | 5/2021 | Wendel | G01B 11/2504 |
| 2023/0221093 | A1* | 7/2023 | Havens | G02B 23/14 |
| | | | | 42/132 |

FOREIGN PATENT DOCUMENTS

| | | |
|---|---|---|
| CN | 108700650 A | 10/2018 |
| DE | 102009001742 | 9/2010 |
| DE | 102010039246 | 2/2012 |
| DE | 102017222135 | 6/2019 |
| DE | 102018106464 | 9/2019 |

OTHER PUBLICATIONS

PCT International Preliminary Report on Patentability including English Translation of PCT Written Opinion of the International Searching Authority for International Application PCT/DE2019/200147, dated Jun. 16, 2021, 8 pages, International Bureau of WIPO, Geneva, Switzerland.

German Search Report for German Patent Application No. 10 2018 222 796.9, dated Oct. 25, 2019, 7 pages, German Patent and Trademark Office, Muenchen, Germany, with English partial translation, 5 pages.

Peter Sturm, "Critical Motion Sequences for Monocular Self-Calibration and Uncalibrated Euclidean Reconstruction", CVPR-IEEE International Conference on Computer Vision and Pattern Recognition, Jun. 1997, pp. 1100-1105 (reprint 9 pages).

Richard Hartley et al., "Multiple View Geometry in Computer Vision", Second Edition, Cambridge University Press, 673 pages.

Engelbert Hofbauer, Dissertation "Optisches Verfahren zur zweidimensionalen Messung von Winkeln und Winkeländerungen bei großen Messabständen" ("Optical Method for Two-Dimensional Measurement of Angles and Angle Changes at Large Measurement Spacing Distances"), Mar. 2008; Technical University of Ilmenau, Germany, 141 pages; urn:nbn:de:gbv: ilm1-2008000035; with English abstract.

Chinese Office Action for Chinese Application No. 201980073977.7, dated Sep. 28, 2023 with translation, 13 pages.

* cited by examiner

ASSEMBLY AND MEASUREMENT OF AN ASSEMBLY FOR CALIBRATING A CAMERA

The invention relates to a measurement system of an assembly for calibrating a camera, a method for measuring a camera calibration system, a computer program and a computer-readable medium.

Parameters of a camera that are required in order to use the camera as a measuring system substantially describe the projection mapping of three-dimensional points into the image. These parameters can be determined during production of the camera by a three-dimensional calibration assembly with, e.g., boards on which patterns are printed, so-called targets. The evaluation is effected on the basis of known geometric ratios of the assembly and the points of the pattern detected in the image of the camera to be calibrated. The established parameters include the light propagation paths within the optics (intrinsic parameters) and the pose (position and orientation) of the optics in a selected coordinate system in space (extrinsic parameters).

The intrinsic parameters of a camera to be calibrated are saved for further use. The extrinsic and the intrinsic parameters are saved and often continue to be used in order to examine the requirements of the optics and the way the camera is assembled at the end of production.

One requirement of the described camera calibration systems is that the precisely adjusted targets, but also the location of the camera accommodation, must not be displaced over time. They also have to be intrinsically stable. Such camera calibration systems are very expensive and maintenance-intensive.

It is an object of the invention to provide an assembly and a method for measuring the camera calibration assembly, which allows a simple assembly which, to the greatest possible extent, does not require servicing.

The object is achieved by the subject-matter of the independent claims. Advantageous embodiments are the subject-matter of the dependent claims, the following description, and the figures.

In this description, the terms "accommodation" and "to accommodate" are exclusively understood to be the mechanical accommodating of an object by a holding device such as, e.g., of a camera or a camera housing by a mechanical adapter or by means of a mechanical interface. The photographic acquisition of an image is expressed throughout by the term "capturing" of an image or of an object such as, e.g., of a calibration target.

According to an embodiment, an assembly for calibrating a camera is provided. The assembly has the following elements: an auxiliary target, a reference camera in a reference camera housing, a reference camera adapter for accommodating the reference camera housing or the auxiliary target, a calibration camera adapter for accommodating the camera to be calibrated (calibration camera), a first positioning base for accommodating the reference camera adapter for capturing a first image of the reference camera or for accommodating the calibration camera adapter, a second positioning base for accommodating the reference camera for capturing a second image and at least one calibration target. The at least one calibration target is arranged such that it can be captured by the reference camera or calibration camera accommodated by the first positioning base. The first positioning base is arranged such that the first image contains the at least one calibration target. The second positioning base is arranged such that the second image of the reference camera accommodated there contains the at least one calibration target and the auxiliary target accommodated in the first positioning base.

The proposed assembly consequently includes at least two targets, wherein targets are understood to be, e.g., boards, on which features, e.g., a checkerboard or circular pattern are printed. The targets are preferably set up at a certain distance and in a certain orientation in the calibrating space so that they can cover the image region of the calibration camera. The reference camera is preferably mounted so that the images thereof are covered as completely as possible with the patterns of the targets.

According to an advantageous embodiment, the first positioning base has a first mechanical interface type for accommodating the calibration camera adapter or the reference camera adapter. The reference camera adapter has a second mechanical interface type for accommodating the reference camera housing or the auxiliary target and a first interface counterpart. Furthermore, the calibration camera adapter for accommodating the calibration camera has a first interface counterpart, the second positioning base has a second mechanical interface type for accommodating the reference camera housing.

If provided, a third positioning base has the second mechanical interface type.

The auxiliary target and the reference camera housing can consequently be accommodated by the same adapter, the reference camera adapter. The further adapter, i.e., the calibration camera adapter, accommodates the calibration camera. By virtue of the fact that they have the same interface type, i.e., the first interface type, both adapters fit on the first positioning base. Thanks to the special adapter for the reference camera, which, in order to accommodate the latter, has the second interface type, which is identical to the interface type of the further positioning base, the reference camera can be placed on all the available positioning bases.

The individual components, i.e., reference camera housing, interfaces of the adapters and of the positioning base, and the adapter for accommodating the calibration camera, each have a specific relative location or orientation with respect to one another, which can be determined by a measurement, e.g., during the assembly of the system. In this case, a reference coordinate system can be spanned, e.g., by a corner and the adjoining edges of the reference camera housing. All of the positions and orientations of the assembly can be based on this reference coordinate system. Consequently, the housing of the reference camera and the housing and optics of an ideal calibration camera can in particular be placed in a geometrical relationship with one another.

The auxiliary calibration target can preferably be applied to a cube which is fastened via the reference camera adapter to the first positioning base, that is to say the positioning base into which a product camera to be calibrated is later inserted.

In the case of the assembly, a geometrical relationship consequently exists between the various components. The housing of the reference camera preferably has a pose with respect to the first positioning base due to the adapter or the interfaces. This pose does not change over time and can be determined in advance, e.g., by tactile measurement, and can consequently be assumed to be known. Accordingly, a pose between the housing or optics of an ideal calibration camera and the first positioning base can be determined and can be assumed to be known. If an unaltered location of the accommodation components is assumed, a specific unalterable and known geometrical relationship between the reference camera and an ideal calibration camera is consequently provided in a sub-system consisting of a reference camera, a first positioning base and a calibration camera.

According to a preferred embodiment, the assembly has two or more calibration targets (e.g., flat checkerboard patterns) which are arranged in a non-coplanar manner to one another. This avoids an ambiguous (degenerated) spatial scene (see further embodiments). Advantageously, each of the calibration targets can be clearly identified, e.g., by appropriate codings. In the case of a plurality of targets, each calibration target can thus have an identification pattern for identification thereof.

The first and the second positioning base are preferably arranged and configured such that, in the event of the reference camera being accommodated in the first positioning base (via the reference camera adapter) compared with being accommodated in the second positioning base, each of the six spatial degrees of freedom of the pose of the reference camera is (sufficiently) different. This option also serves to avoid ambiguities, in this case however based on the location and orientation of the reference camera in the two different positions. The location of the cameras should preferably not correspond to a so-called "critical movement".

A first method for measuring an assembly for calibrating a camera to be calibrated has the following steps:
  positioning a reference camera on a first positioning base;
  capturing a first image of the at least one calibration target by means of the reference camera;
  positioning an auxiliary target on the first positioning base;
  positioning the reference camera on a second positioning base;
  capturing a second image of the at least one calibration target and of the auxiliary target by means of the reference camera;
  determining the pose of the auxiliary target in relation to the at least one calibration target by evaluating the second image;
  determining the location of the (all the) calibration targets with respect to one another; and
  determining unknown parameters of the reference camera by evaluating the first and the second captured image, wherein the extrinsic parameters from the first image and the relative pose of the auxiliary target are established with respect to the first calibration target in the second image.

The pose of the auxiliary target in the second image gives some indication of the pose of the reference camera when the first image is captured. Taking account of this information, further unknown parameters of the reference camera can be determined by evaluating the first captured image.

According to an advantageous configuration of the method, the real dimensions of the assembly are measured from the first positioning base, interfaces, reference camera adapter, auxiliary target and reference camera prior to capturing the images with the reference camera. Thus, (the) parameters of the reference camera can be optimized by comparing the real dimensions as far as they are known with the dimensions established from the evaluations of the images of the reference camera.

An embodiment of the above method will be discussed first, in which the intrinsic and the extrinsic parameters of the reference camera are known with respect to the reference camera housing. An acquisition of a second image is advantageous but not necessary for the discussed embodiment. In the case of an advantageous procurement of the patterns and an advantageous arrangement of the patterns in space, it is already possible to estimate the pose of the pattern (points) with respect to one another in the way described below from the captured pattern of the targets in the first image of the reference camera. In a further embodiment, this can be effected by adding additional knowledge about the assembly such as, e.g., measured size and/or planarity of the patterns. It is particularly advantageous to consider additional knowledge about the dimensions of the auxiliary target which is preferably produced with a high degree of accuracy. Furthermore, the pose of the reference camera with respect to the first target and, consequently, due to the known pose of the reference camera with respect to the reference camera housing (extrinsic calibration), the pose of the first base and, consequently, of the optics of an ideal calibration camera with respect to the first target can be estimated. If multiple target patterns are provided and captured by the first image, the mutual relationship of these patterns, that is to say a measurement of the assembly, is also possible. With the information obtained, it is possible to establish the intrinsic but also the extrinsic parameters of a camera to be calibrated in the given assembly.

The latter case describes a customary or obvious embodiment of optical systems for measuring calibration assemblies. Embodiments of the invention will now be presented, in which the assumptions about the known parameters of the reference camera are reduced.

An embodiment of the invention will be discussed next, in which only the intrinsic parameters of the reference camera are known.

As previously, in the case of an advantageous procurement of the pattern and an advantageous arrangement of the patterns in space from the images of the patterns of the targets captured by the reference camera, it is possible to estimate the location of the targets with respect to one another in the manner described below.

According to the description above, a second image of the reference camera is captured from the second positioning base in this embodiment. The auxiliary target is accommodated on the first positioning base with the aid of the reference camera adapter. Therefore, the reference camera captures both the first calibration target and the auxiliary target in the second image, which makes it possible to estimate the relative pose of these targets with respect to one another. In this way, the pose of the reference camera housing with respect to the first calibration target is consequently obtained due to the known pose between the reference camera housing and the auxiliary target. By adding the pose of the reference camera with respect to the first calibration target from the first image, the pose of the reference camera with respect to the reference camera housing, that is to say the extrinsic parameters of the reference camera, is/are obtained. Thanks to the acquisitions from multiple views and thanks to the ingenious method, the discussed embodiment has thus been traced back to the first case described of all the known parameters of the reference camera. The measurement system thus calibrates itself extrinsically. Since, in the case of this method, the pose of the reference camera in the second base with respect to (all of the targets in) the assembly is established, the second base preferably does not have to be designed to be repeatable.

Once the geometries are known, all the parameters of the calibration camera from the first image can, e.g., be estimated in the way explained below.

A further embodiment of the invention is now presented, in which both the intrinsic and the extrinsic parameters of the reference camera are unknown.

According to an embodiment, the unknown intrinsic parameters of the reference camera can be estimated in the way described below from the two acquisitions of the last method described, assuming the geometry is known (e.g., the size of the patterns and/or planarity of the targets is/are known). For a robust system, it is admittedly worth recommending using the embodiment described below.

According to an embodiment, the measurement system has a third positioning base arranged such that the reference camera accommodated by the third positioning base can capture the auxiliary target accommodated by the first positioning base and the at least one calibration target in a third image. If the reference camera is thus placed on the third positioning base, the calibration target and the auxiliary target can be captured from a further position, as a result of which the accuracy of the calibration of the system is increased. In addition to increasing the accuracy, the intrinsic and extrinsic calibration of the reference camera can also be established from the visible patterns in the three images (first image without auxiliary target, reference camera on the first base; second and third image with auxiliary target, reference camera on the second or third base) by the method described below. This can take place under the previously indicated conditions by means of the location of the patterns and reference camera positions with very few assumptions regarding the dimensions of the assembly. It is merely necessary that a distance (e.g., the length of the calibration pattern on the first calibration target) of the real physical assembly is known. The presented case can then thus be traced back to the first, in that the system calibrates itself intrinsically and extrinsically. Large deviations in the optical parameters of the reference camera (e.g., changing the optics) can therefore be tolerated, without having to service the reference camera further.

The system consequently provides an arrangement that allows the assembly which is provided for calibrating cameras to be measured by evaluating the captured images. In the further embodiment described, a system is provided that calibrates itself. It should be noted here that this involves measuring the assembly, which is why the product camera to be calibrated is not also included in the method. Rather, the assembly is standardized by measuring the assembly, which makes possible defined surroundings for subsequent camera calibration. Thanks to the measurement, smaller, unwanted alterations to the assembly resulting, e.g., from environmental influences or ordinary material alterations over time, can be compensated for, without having to re-adjust or even exchange the targets.

According to a further embodiment, the calibration targets of the camera calibration measurement system each have an identification pattern for identification thereof. This allows targets to have identical patterns such as, e.g., a checkerboard or circular pattern, except for the identification pattern, and the various targets on the captured images to nevertheless be distinguished and identified so that each element of the patterns can also be accurately identified on all targets. The identification patterns can be, for example, dots or other geometric shapes in predetermined pattern elements, such as, e.g., the squares. Other possibilities would be coding by colors or gray scales, QR codes, etc.

The assembly presented allows a series of faults in the assembly or the camera to be detected by measuring the components.

The first positioning base and the calibration targets are the components in the system that are most likely to experience alterations over time. The calibration targets can, by way of example, experience aging due to environmental influences such as humidity and temperature, which aging makes itself felt, e.g., in a mechanical deformation. The first positioning base can be displaced due to frequent changes of the calibration cameras. In contrast to this, the reference camera is only removed from the second positioning base at greater time intervals so that the pose of the second positioning base remains stable over a relatively long period of time.

If alterations to the assembly have been ascertained, for instance due to an alteration in the established parameters or quality measures, the assembly can be readjusted and the calibration target can be captured again with the reference camera from the first positioning base.

According to an embodiment, the measurement system has an evaluation unit which is designed to determine the alignment of the calibration target and of the auxiliary target and to determine the unknown parameters of the reference camera by evaluating at least the first and the second image. The evaluation unit, which can have wired or wireless communication interfaces with the reference camera or the camera to be calibrated, is typically a computer or a computing unit having a processor, which relates the spatial points with the pixels stipulated for the calibration, and carries out the calibration according to, e.g., a calculation rule such as that described below.

The case of how a camera is calibrated in a measured assembly will be discussed first. This is the case after the assembly has been measured with the system presented here. In this way, the product camera is, e.g., calibrated.

Let the projection model of the camera be constituted by the parameterizable mapping k, so that each pixel p at spatial point s fulfils the equation $$p=k(s,\theta),$$

wherein $\theta$ is a vector of parameters, which models the respective physical camera. Since the location of the calibration patterns with respect to one another and, consequently, the location of the markings on the patterns in space, and the location of the first positioning base with respect to the first calibration pattern are known, the calibration parameters can be calculated by minimizing $$l(\theta) = \sum_i \| p_i - k(s_i, \theta) \|^2,$$

wherein $s_i$ represents the spatial positions of each point i of a feature (e.g., corners of a square) and $p_i$ represents the associated pixels.

Occasionally, the (virtual) pose of the optics with respect to the reference coordinate system of the assembly, e.g., the center of the first target or the points thereon, is a result. Since the pose of the first positioning base in relation to the reference coordinate system is known, the pose of the optics with respect to the first positioning base is also known and, therefore, also the camera adapter of the camera to be calibrated.

The quality of the calibration parameters found is crucial for deciding whether the camera can be delivered, e.g., to the customer, or whether there is a fault in the camera or the assembly. If the result is positive, the parameters are entered in a database having calibration parameters for the camera, and the camera is delivered. In the latter case, the assembly must, e.g., be readjusted. In addition to checking the parameters for previously stipulated limits, a preferred quality value is l(theta).

In an embodiment of the invention, the intrinsically and extrinsically calibrated reference camera is evaluated in the first reference base, assuming a calibrated assembly from the first image. If the values of the quality parameters deviate too strongly from the expected parameters, the complete assembly measurement must be performed, which is described next.

According to an embodiment, a method for measuring a camera calibration assembly is provided, having the steps of:

- positioning the reference camera on the first positioning base,
- capturing a first image of the at least one calibration target,
- positioning the auxiliary target on the first positioning base,
- positioning the reference camera on the second positioning base,
- capturing a second image of the at least one calibration target and of the auxiliary target,
- positioning the reference camera on the third positioning base,
- capturing a third image of the at least one calibration target and of the auxiliary calibration target,
- determining all of the unknown parameters of the reference camera, the pose of all the targets of the assembly in the reference coordinate system of the assembly, and the pose of the first base in the reference coordinate system,
- and establishing quality values of the established parameters of the assembly, and
- saving the parameters, if the quality value corresponds to a predefined value.

A reference image of the calibration target is created first of all by the method, by capturing the first image with the reference camera on the first positioning base. In the next step, instead of the reference camera, the auxiliary target is placed on the first positioning base and the reference camera is placed on the second positioning base, in order to capture the second image of the auxiliary target and the calibration target from the latter. The poses of the subsystem, consisting of interfaces, adapter, reference camera, calibration camera adapter and first positioning base or auxiliary target are already known as a result of, e.g., a previous tactile measurement. The pose of the calibration target in relation to the auxiliary target or, therefore, also the positioning base can now continue to be established by the second image. With this information from the two images, the extrinsic parameters of the reference camera can also be calculated.

The method of this embodiment is, consequently, based on at least two calibration targets for measuring the assembly and determining the extrinsic parameters, which are captured by at least two positioning base positions or camera positions with a respective alignment and the capturing of a third image from a third positioning base in order to determine the unknown parameters of the reference camera. Additional targets or positioning base positions can be added to the assembly, which contribute to improving the accuracy.

Since the method for measuring the assembly is implemented repeatedly (e.g., once a week), the intrinsic parameters can be calculated iteratively, with the intrinsic parameters being corrected in each case by a new measurement.

Quality criteria are enlisted in order to determine whether the established parameters of the assembly are incorrect, or whether they have errors that are too large. The calculated quality values are compared, e.g., with a threshold value. If a quality criterion is met, the values of the parameters of the assembly are saved and can be used for the calibration of the product cameras. Otherwise, it must be established whether the reference camera is subject to a fault or whether the assembly has been significantly displaced.

If the geometry changes, e.g., over time, or the calibration target is deformed, this is recognized on the basis of the measurement of the assembly and can be compensated for by way of calculation to a certain extent. The second image can be captured, for example, prior to each camera calibration process or at least at specific time intervals.

According to an embodiment, a program element is provided, which, if it is run on a control unit of a computer, evaluates the images and determines the first position relative to the two calibration targets by evaluating the captured images according to the presented method.

According to an embodiment, the program element is saved on a computer-readable medium.

The invention is explained below in detail with reference to exemplary embodiments and by means of the figures.

Figure 1:
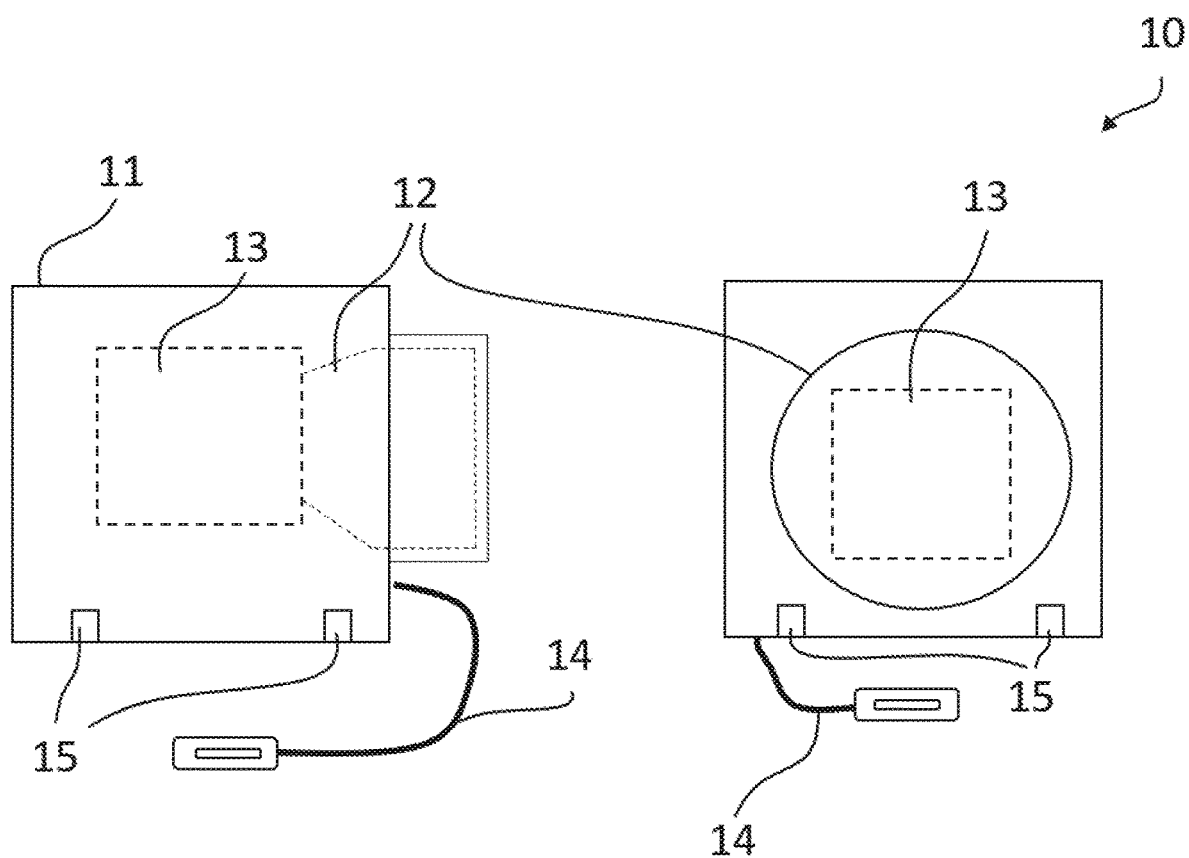
FIG. 1 shows a side and front view of a reference camera according to an exemplary embodiment of the invention.

FIG. 1 first of all shows a side view and a front view of the reference camera 10. These can be embedded in a rectangular housing 11 in an exemplary embodiment. The reference camera 10 in the reference camera housing consists of the optics 12, the imager housing having electronics 13, the connection 14 and has a mechanical interface 15 of a second interface type, in order to fix the reference camera 10 in the assembly. To this end, the interface 15 is designed in a suitable manner in order to be accommodated by a positioning base. This type of (second) positioning base is inserted at the positions 55 and 56 shown in FIG. 5. Alternatively, the interface 15 is accommodated by a reference camera adapter 40. The housing is measured tactilely with a high degree of accuracy and the pose of the corners with respect to the interface 15 is established.

Figure 2:
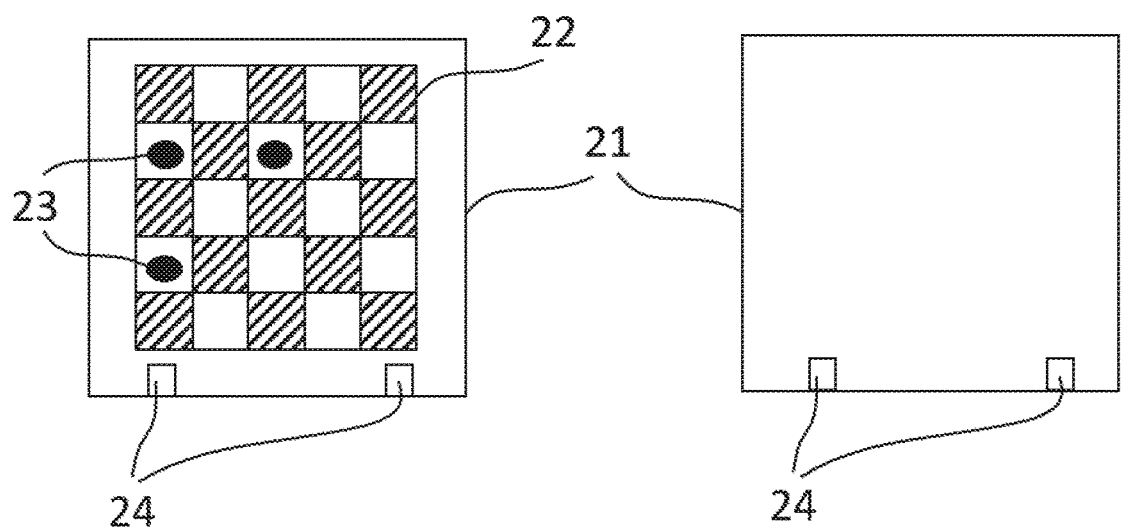
FIG. 2 shows a calibration target according to an exemplary embodiment of the invention.

FIG. 2 shows the calibration pattern of an auxiliary target 21 in the form of a cube according to an exemplary embodiment. The cube has a checkerboard pattern 22 on some sides, and a clear coding 23 which clearly identifies the side of the cube. An example of such a coding is a modification of the QR code, as indicated by the sketch. Furthermore, the cube has a mechanical interface 24 that is identical to the interface 15 of the reference camera 10 (second interface type, depicted as a square). The calibration pattern is measured optically with a high degree of accuracy with respect to the reference edges of the cube and the pose, that is to say the position and orientation of the reference edges, is established tactilely with respect to the interface 24. The auxiliary target 21 can be placed on the first positioning base 43 by means of a mechanical adapter such as the reference camera adapter 40 shown in FIG. 4.

Figure 3:
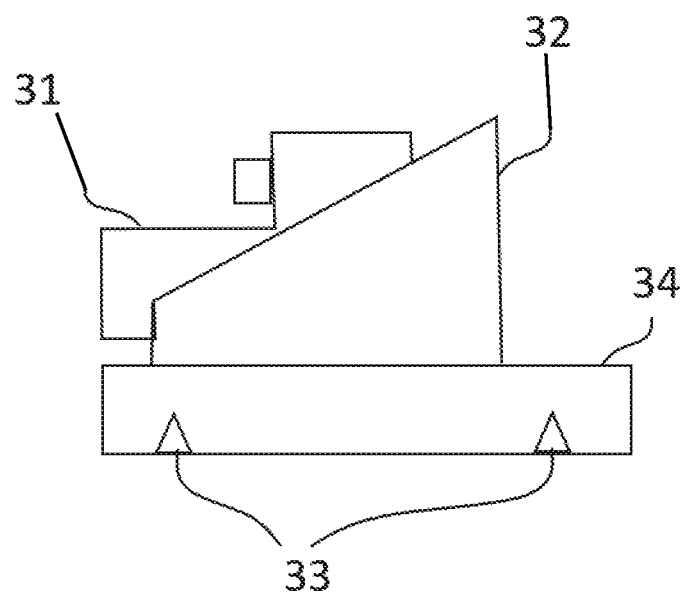
FIG. 3 shows a camera adapter according to an exemplary embodiment of the invention.

FIG. 3 schematically shows, according to an exemplary embodiment, a (camera) adapter 34 having a housing 32, into which a camera 31 to be calibrated, i.e., a product camera, can be inserted. The camera adapter 34 has a mechanical interface (counterpart) 33 of a first interface type, which can be placed on an interface 44 shown in FIG. 4 of the first positioning base 43. The first interface type is symbolically depicted as a triangle in FIGS. 3 and 4.

Figure 4:
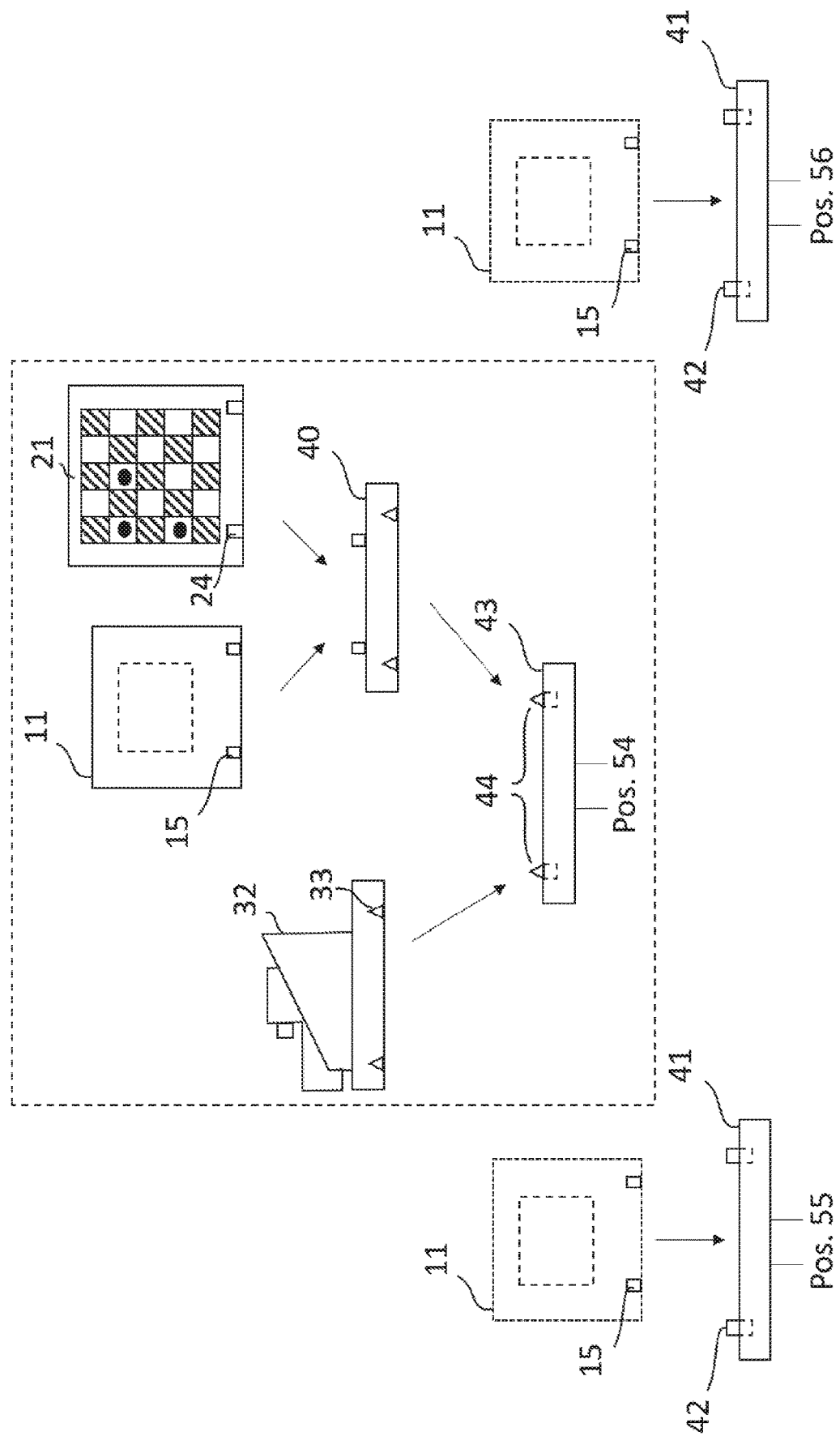
FIG. 4 shows an arrangement of the adapters and positioning bases according to an exemplary embodiment of the invention.

FIG. 4 schematically shows, at the positions 55 and 56, a second positioning base 41 having an interface 42 (of the second type), which forms the counterpart to the interface 15. The reference camera housing 11 can consequently be fitted onto the second positioning base 41 at the second position 55 or the third position 56. The reference camera housing 11 or module 10 can be fitted onto a reference camera adapter 40 by way of the interface of the second type 15. The reference camera housing 11 and reference camera adapter 40 are fitted onto the first positioning base 43 at the position 54 (interface of the first type 44). In the first position 54, the first image is captured by the reference camera 10. For the second (and if applicable third) image, the auxiliary target 21 is placed on the reference camera adapter 40 (at the first position 54) and the reference camera 10 is placed on the (second) positioning base 41 at the second position 55 (if applicable third position 56).

Figure 5:
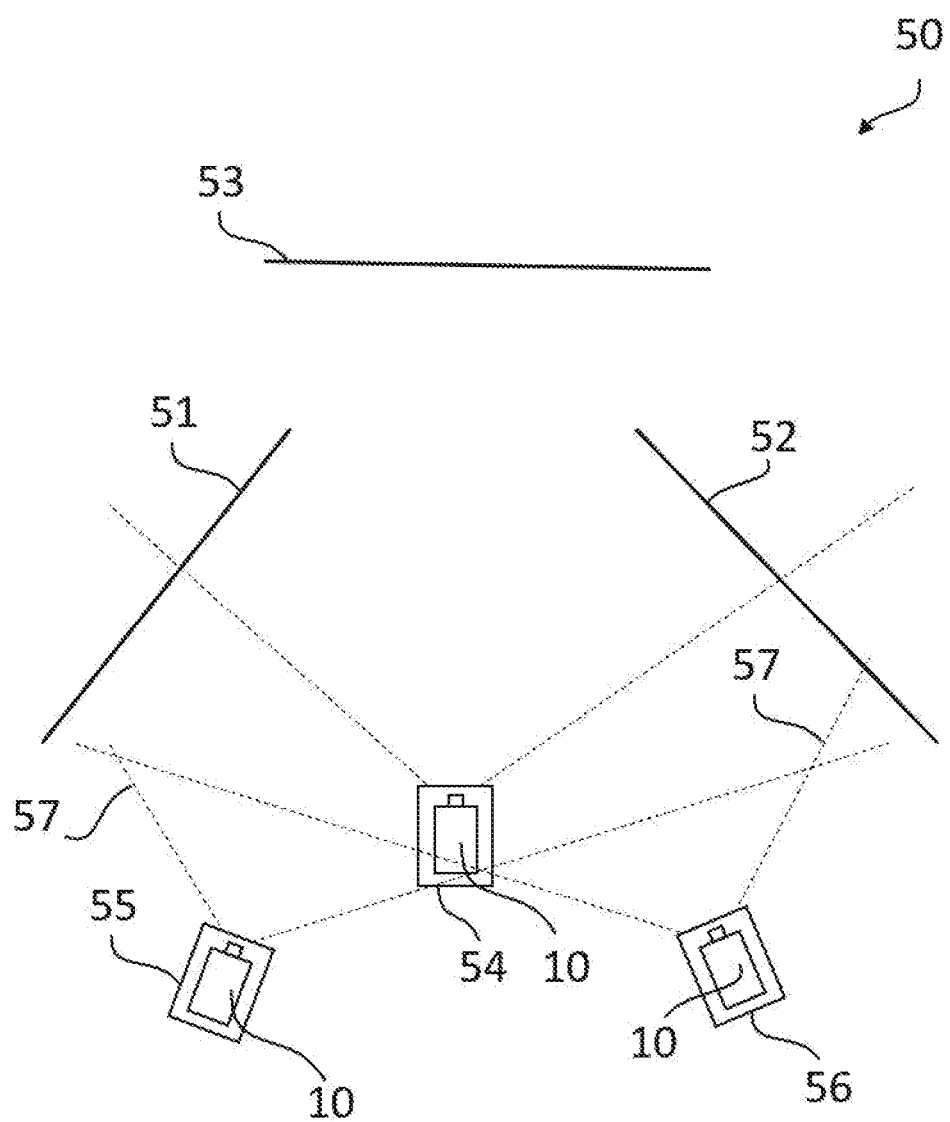
FIG. 5 shows an arrangement of the positioning bases and targets according to an exemplary embodiment of the invention.

The first positioning base 43 constitutes a particular embodiment of a positioning base and is inserted at the middle position 54 shown in FIG. 5 (if three positioning bases are inserted). It can accommodate both the product camera 31 in the housing 32 and, by way of the adapter 40, the reference camera 11 and the cube 21 having the auxiliary target.

FIG. 5 shows, according to an exemplary embodiment, an arrangement having three calibration patterns 51, 52, 53 and three positioning bases 54, 55, 56 which are designed to fasten a reference camera 10 or further elements, from above. The fields of view of the reference camera 10 are indicated by the dashed lines 57 in FIG. 5, when said reference camera is inserted in the positioning bases 43, 41 at the positions 54, 55, 56. The positioning bases 41 at the second and third position 55, 56 deviate significantly in distance, in height, and in the coordinate axes with respect to the middle location 54 and among one another.

Figure 6:
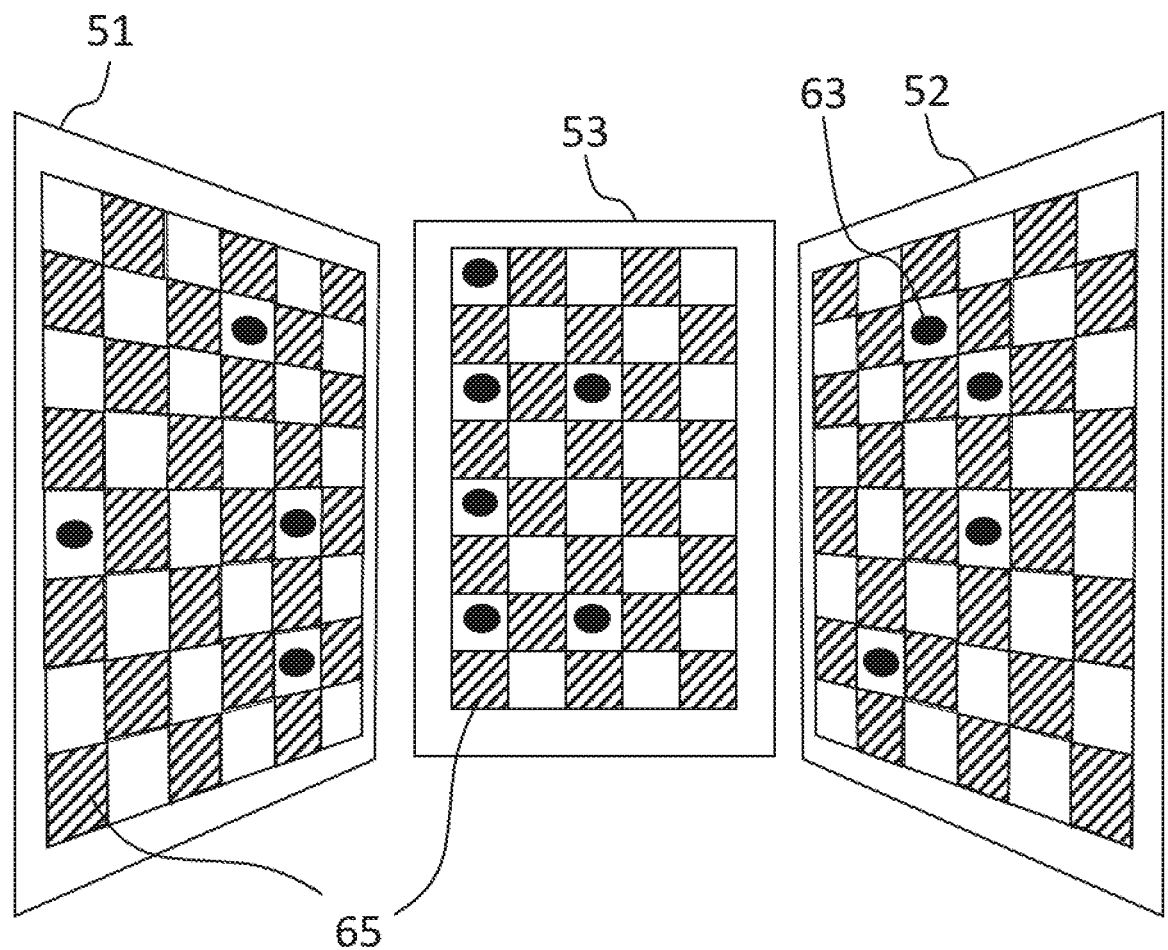
FIG. 6 shows calibration targets from the viewpoint of the first positioning base according to an exemplary embodiment of the invention.

FIG. 6 shows, according to an exemplary embodiment, the arrangement of the three calibration targets 51, 52, and 53 from the viewpoint of the camera to be calibrated or of the reference camera 10, if the latter is fastened at the middle position 54. It should be noted that markings 63 are affixed to the targets, which clearly identify the respective target and the location of the target pattern. The image of the camera to be calibrated and of the reference camera 10 is completely covered by the calibration pattern in FIG. 6. Furthermore, each box 65 (which is relevant for calibration of a camera to be tested) of the targets should be visible in the images of the reference camera 10 in at least two views.

Figure 7:
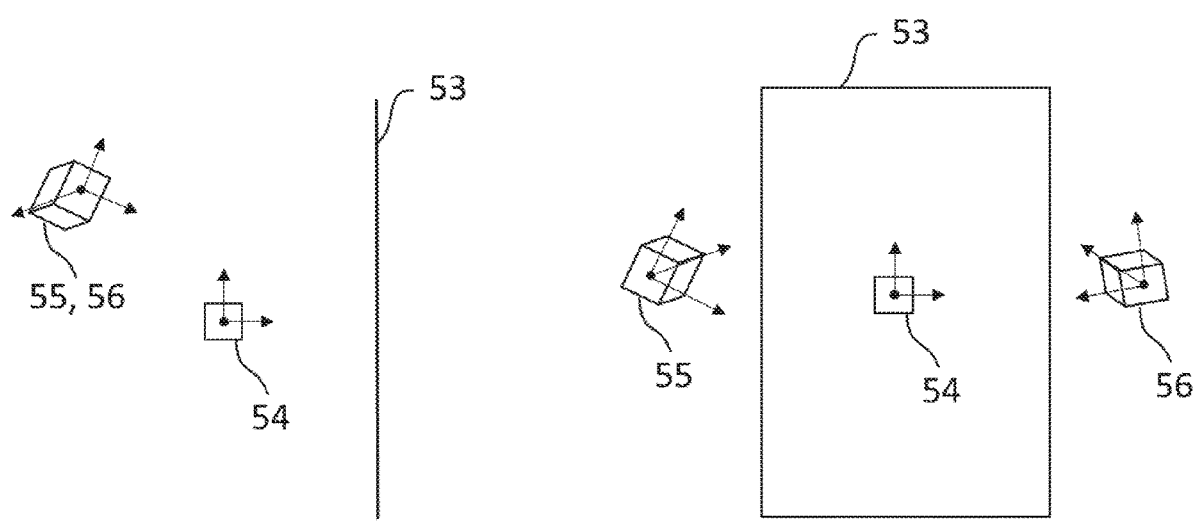
FIG. 7 shows an arrangement of positioning bases according to an exemplary embodiment of the invention.

A preferred arrangement, which has only one target 53 for the sake of clarity, is sketched in FIG. 7 in two different views. The left part of FIG. 7 shows a view from the right side of the arrangement, while the right part of FIG. 7 shows a view from the front of the arrangement. It is obvious from the figure that the positions 55 and 56 are arranged at a greater distance from the calibration patterns 51, 52, 53 and higher than the positioning base 54 and are slightly rotated in all coordinate axes.

Figure 8:
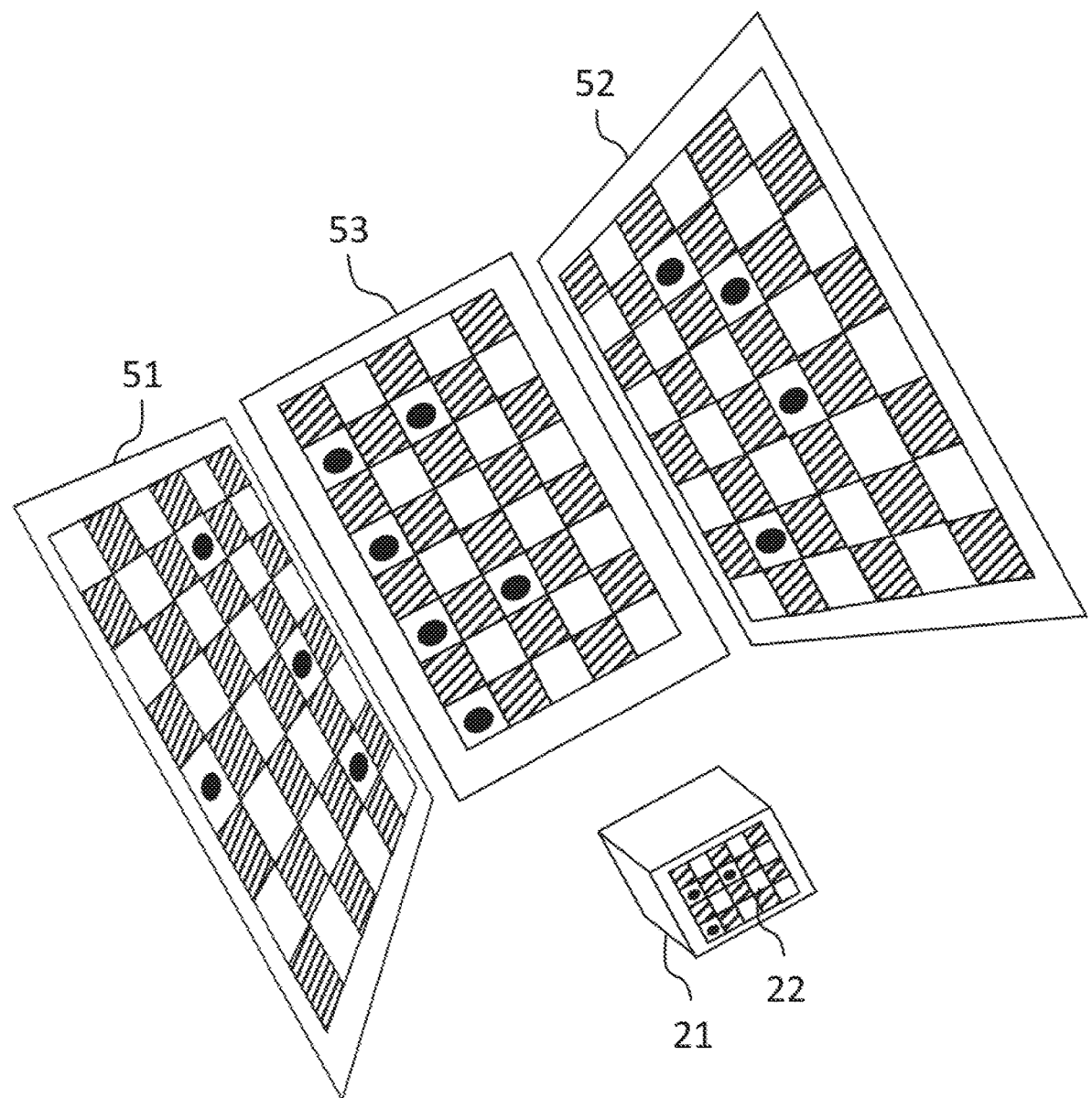
FIG. 8 shows calibration targets from the viewpoint of the second positioning bases according to an exemplary embodiment of the invention.

FIG. 8 schematically shows, according to an exemplary embodiment, the viewpoint of the reference camera 10 from the second positioning base 41 at position 55 of the calibration targets 51, 52, 53. The calibration targets 51, 52 and 53 and the auxiliary target, or the cube 21, which has the pattern 22, can be seen from its viewpoint. The positioning base 55 is not rotated at right angles in all three axes with respect to the coordinate system of the space, which creates the oblique perspective shown in FIG. 8

The arrangement described above can, depending on the task, vary in terms of the number and orientation of the patterns.

Figure 9:
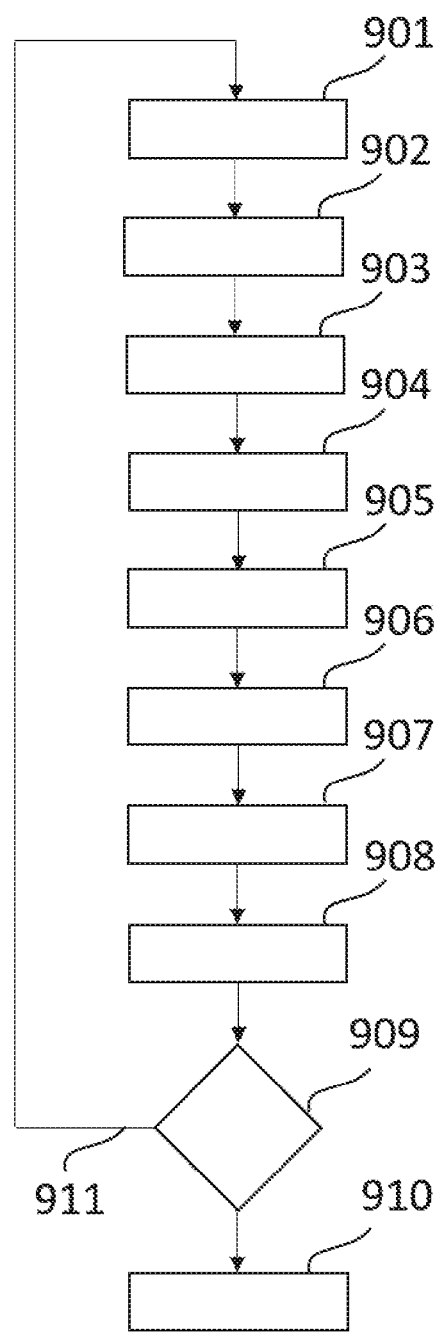
FIG. 9 shows a flow diagram of the camera calibration measurement method according to an exemplary embodiment of the invention.

The procedure for measuring the assembly according to an exemplary embodiment is illustrated in the flow diagram in FIG. 9. The reference camera 10 is placed successively on the positioning bases 54, 55 and optionally 56. If the reference camera 10 is located at positions 55 or 56, the cube is positioned on the positioning base 54. The following steps are carried out in accordance with the flowchart shown in FIG. 9:

positioning 901 the reference camera on the first positioning base, capturing 902 a first image of the at least one calibration target, positioning 903 the auxiliary target on the first positioning base, positioning 904 the reference camera on the second positioning base, capturing 905 a second image of the at least one calibration target and of the auxiliary target, positioning 906 the reference camera (10) on the third positioning base, capturing 907 a third image of the at least one calibration target and of the auxiliary calibration target, determining 908 the alignment and the position of the at least one calibration target relative to the first positioning base by evaluating the first image, and determining the extrinsic parameters of the reference camera from the first image and the relative alignment and the position of the first positioning base by evaluating the first and the second captured image, establishing 909 a quality value of the intrinsic parameters, and saving 910 the intrinsic parameters, if the quality value corresponds to a predefined value.

If the quality test in 909 leads to a negative result, steps 901 to 908 are carried out again, e.g., following a re-adjustment.

Figure 10:
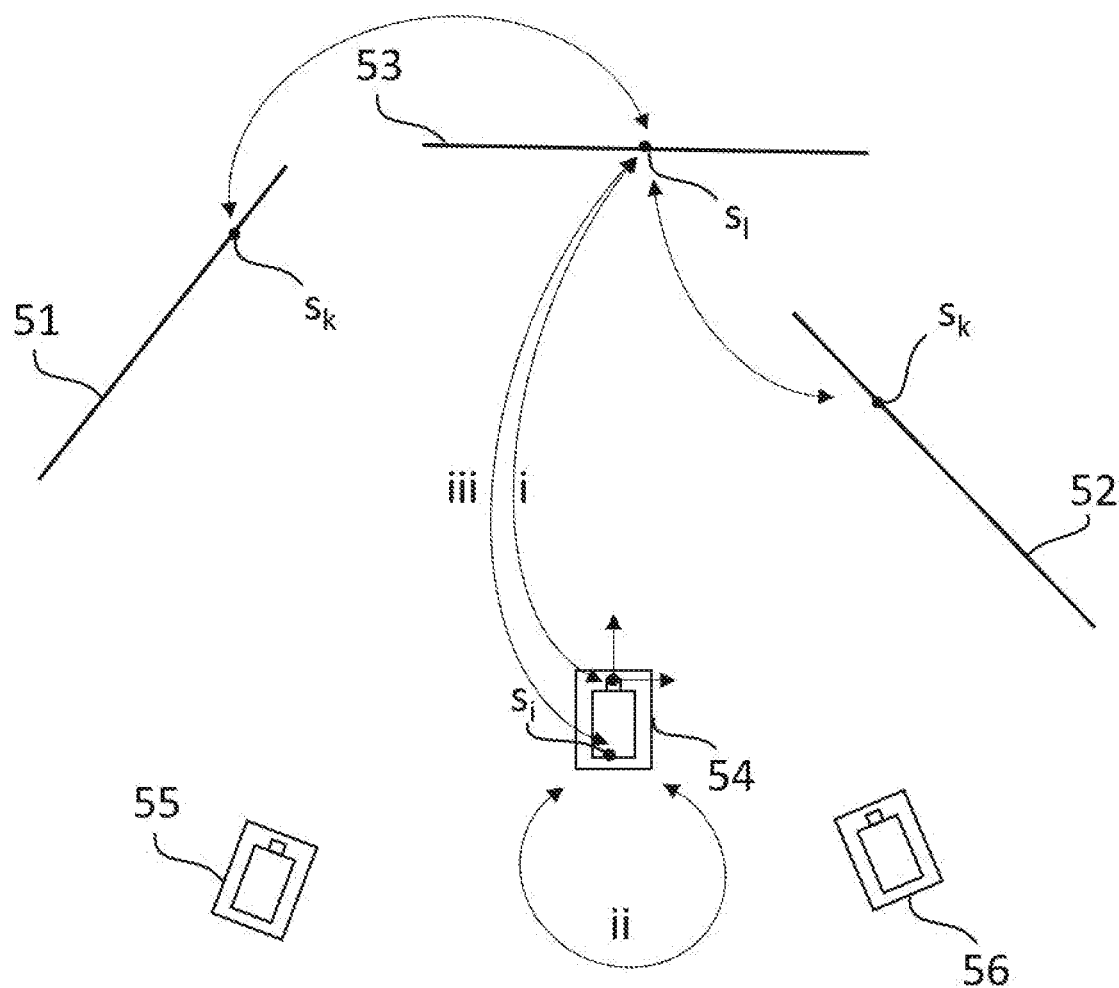
FIG. 10 shows the relationship of pixels and spatial points according to an exemplary embodiment of the invention.

The quality of the calibration with the established parameters $\theta$ is estimated and explained below with reference to FIG. 10. Let all the possible unknown spatial positions of the features 65 be designated by $s_i$. The points $s_i$ include the points of the three targets 51, 52, 53, and the points on the cube 21. Let the pixel $p_{ij}$ then be the illustration (which is noisy due to the pixel noise) of the feature $s_i$ in the image $j=1, \ldots 3$, if this can be seen in the image and any point otherwise. Let the weights $w_{ij}$ be further defined as:

$w_{ij}$=1 then and only then if the feature $s_i$ can be seen in the image j, and
$w_{ij}$=0 otherwise.

An unknown vector $\theta_j$, which includes the intrinsic and the extrinsic parameters of the reference camera 10, also forms part of each view j=1, . . . 3. The intrinsic parameters for all three views are assumed to be the same. The view regarding the positioning base 54 is taken as the origin and is not considered as a parameter below.

If the points $p_{ij}$ and $s_i$ are given, as described above, the expression $$L(\theta) = \frac{1}{\left|2\sum w_{ij}\right|} \sum_j \sum_i w_{ij} \| p_{ij} - k(s_i, \theta_j) \|^2$$

is minimized, beginning with a reasonable starting value from a previous or initial calibration.

From the theory of photogrammetry or multiple view geometry, there exists an $\theta^*$ under given conditions, in which $L(\theta^*)$ has an isolated minimum. $L(\theta^*)$ lies in the region of the noise of the feature extraction. The value $L(\theta^*)$ is a quality feature of the method. The minimum additionally lies in a permissible range not far from the starting solution. If the above does not apply, an assembly displacement or a defect in the reference camera 10 is suspected, and the assembly has to be serviced. In the positive case (that is, when all of the above conditions are met), the parameter values contained therein have the following interpretation, which is illustrated in FIG. 10.

The intrinsic parameters describe a standardization or camera calibration of the reference camera 10. This therefore only has to be reference-calibrated once for the assembly. Each measurement then supplies a subsequent improvement of the parameters, which fit the current conditions (displacement, environment, etc.). If the parameters do not significantly match the starting parameters of the reference camera 10, a mechanical fault of the reference camera 10 or of the assembly is suspected. In the latter case, the assembly has to be serviced.

The points $s_i$ contain the 3D points sought for the calibration on the targets in the coordinate system of the optics of the reference camera 10 (i) in the positioning base 54. The quality of the print, the planarity of the targets, and the location of the targets with respect to one another can be established from these. If the points do not significantly match the previously established or stipulated values, a mechanical fault of the assembly or of the reference camera 10 is suspected. In the latter case, the assembly has to be serviced.

However, the points $s_i$ also contain the 3D points of the cube since these are seen from positions 55 and 56 (iii). However, since the cube is measured with a high degree of accuracy and the relationship to the reference camera 10 is known (ii), the location of the optics of the reference camera 10 with respect to the positioning base 54 is known from the measured points. The location of the positioning base with respect to the points $s_i$ on the targets is therefore also known. In other words, the points $s_i$ can now be transferred into the reference coordinate system of the positioning base 54, as required by the calibration method described above. If the established ratios of the positioning base to the targets do not match the previous ones, a displacement of the adapter is suspected. In the latter case, the assembly can be serviced.

If the quality criteria of the calibration of the reference camera 10 are met, the established parameters are stored in a data memory and enlisted for the subsequent calibrations of the camera to be calibrated. If this is not the case, the assembly can be serviced and/or the measurement can be repeated.

In order to implement the above method, it may be necessary for the scene to not be degenerated and the location of the cameras to not correspond to a critical movement.

A degenerated scene can be countered, e.g., by using three planar targets that are not co-planar to one another. Therefore, degenerated configurations of the scene are largely excluded.

A degenerated movement can be countered by the cameras having different positions and all being twisted against each other in all axes.

The assembly can be easily serviced since each measurement also involves standardizing the calibration system (reference camera 10) and verifying the assembly. If a larger deviation has been ascertained by the standardization, the system must be serviced or readjusted. Furthermore, incorrect operation is avoided and sources of interference are reduced. Planar targets manufactured with a high degree of accuracy having very precise printing are not necessary for the assembly. The assembly adapts to small alterations in the printing and planarity of the targets. In particular, it is not necessary to remeasure the targets.

The invention claimed is:

1. An assembly for calibrating a camera to be calibrated, said assembly comprising:
   a first positioning base for accommodating a reference camera adapter or for accommodating an adapter for the camera to be calibrated;
   an auxiliary target;
   the reference camera adapter for accommodating a reference camera housing or the auxiliary target;
   the adapter for accommodating the camera to be calibrated;
   a second positioning base for accommodating the reference camera housing;
   at least one calibration target arranged such that it can be captured by the reference camera accommodated by the first positioning base or can be captured by the camera to be calibrated;
   the reference camera housing for accommodating the reference camera;
   wherein the first positioning base is arranged such that a first image captured by the reference camera accommodated in the first positioning base contains the at least one calibration target; and
   wherein the second positioning base is arranged such that a second image captured by the reference camera accommodated in the second positioning base contains the at least one calibration target and the auxiliary target accommodated in the first positioning base.

2. The assembly according to claim 1, further having a third positioning base for accommodating the reference camera, arranged such that a third image captured by the reference camera accommodated in the third positioning base contains the at least one calibration target and the auxiliary target accommodated in the first positioning base.

3. The assembly according to claim 1, wherein the assembly has three planar calibration targets which are arranged in a non-coplanar manner to one another.

4. The assembly according to claim 1, wherein the first and the second positioning base are arranged and configured such that, in the event of the reference camera being accommodated in the first positioning base compared with being accommodated in the second positioning base, each of the six spatial degrees of freedom of the pose of the reference camera is different.

5. The assembly according to claim 1, wherein
the first positioning base has a first mechanical interface type for accommodating the reference camera adapter or for accommodating the adapter for the camera to be calibrated,
the reference camera adapter has a second mechanical interface type for accommodating the reference camera or the auxiliary target and a first interface counterpart,
the adapter for accommodating the camera to be calibrated has a first interface counterpart,
the second positioning base has a second mechanical interface type for accommodating the reference camera,
the reference camera housing has a second interface counterpart.

6. The assembly according to claim 1, further having an evaluation unit, designed to determine extrinsic and/or intrinsic parameters of the reference camera by evaluating at least the first and the second image.

7. A method for measuring an assembly for calibrating a camera to be calibrated, having the steps of:
positioning a reference camera on a first positioning base,
capturing a first image of the at least one calibration target by means of the reference camera,
positioning an auxiliary target on the first positioning base,
positioning the reference camera on a second positioning base,
capturing a second image of the at least one calibration target and of the auxiliary target by means of the reference camera,
determining the alignment and the position of the auxiliary target in relation to the at least one calibration target by evaluating the second image,
determining the alignment of all of the calibration targets among one another, and
determining unknown parameters of the reference camera by evaluating the first and the second captured image, wherein extrinsic parameters from the first image and the relative alignment and the position of the auxiliary target are established with respect to the first calibration target in the second image.

8. The method according to claim 7, wherein real dimensions of the assembly are measured from the first positioning base, interfaces, reference camera adapter, auxiliary target and reference camera prior to capturing the images with the reference camera.

9. The method according to claim 7, having the steps of
positioning the reference camera on a third positioning base,
capturing a third image of the at least one calibration target and of the auxiliary target by means of the reference camera,
determining the unknown parameters of the reference camera by evaluating all the captured images,
establishing a quality value of intrinsic parameters, and
saving the intrinsic parameters, if the quality value corresponds to a predefined value.

10. A non-transitory computer-readable medium, on which a program element is saved for performing the method according to claim 7.

* * * * *